(12) United States Patent
Ljolje et al.

(10) Patent No.: US 8,738,375 B2
(45) Date of Patent: May 27, 2014

(54) SYSTEM AND METHOD FOR OPTIMIZING SPEECH RECOGNITION AND NATURAL LANGUAGE PARAMETERS WITH USER FEEDBACK

(75) Inventors: Andrej Ljolje, Morris Plains, NJ (US); Diamantino Antonio Caseiro, Philadelphia, PA (US); Mazin Gilbert, Warren, NJ (US); Vincent Goffin, Summit, NJ (US); Taniya Mishra, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 339 days.

(21) Appl. No.: 13/103,665

(22) Filed: May 9, 2011

(65) Prior Publication Data

US 2012/0290298 A1    Nov. 15, 2012

(51) Int. Cl.
*G10L 15/26* (2006.01)

(52) U.S. Cl.
USPC .......................... 704/235; 704/255; 704/244

(58) Field of Classification Search
USPC ......... 704/9, 7, 251, 252, 243, 257, 270, 231, 704/244, 235, 250, 255
See application file for complete search history.

(56) References Cited

U.S. PATENT DOCUMENTS

| | | | |
|---|---|---|---|
| 5,541,836 A * | 7/1996 | Church et al. ................. 704/7 |
| 5,566,272 A | 10/1996 | Brems et al. |
| 5,829,000 A * | 10/1998 | Huang et al. ................. 704/252 |
| 7,542,971 B2 | 6/2009 | Thione et al. |
| 7,860,716 B2 * | 12/2010 | Tian et al. .................... 704/251 |
| 7,925,506 B2 * | 4/2011 | Farmaner et al. ............ 704/257 |
| 8,019,602 B2 | 9/2011 | Yu et al. |
| 8,352,245 B1 * | 1/2013 | Lloyd .............................. 704/9 |
| 2002/0152071 A1 | 10/2002 | Chaiken et al. |
| 2005/0203738 A1 * | 9/2005 | Hwang ........................ 704/243 |
| 2008/0091426 A1 | 4/2008 | Rempel et al. |

* cited by examiner

*Primary Examiner* — Huyen X. Vo

(57) ABSTRACT

Disclosed herein are systems, methods, and non-transitory computer-readable storage media for assigning saliency weights to words of an ASR model. The saliency values assigned to words within an ASR model are based on human perception judgments of previous transcripts. These saliency values are applied as weights to modify an ASR model such that the results of the weighted ASR model in converting a spoken document to a transcript provide a more accurate and useful transcription to the user.

20 Claims, 6 Drawing Sheets

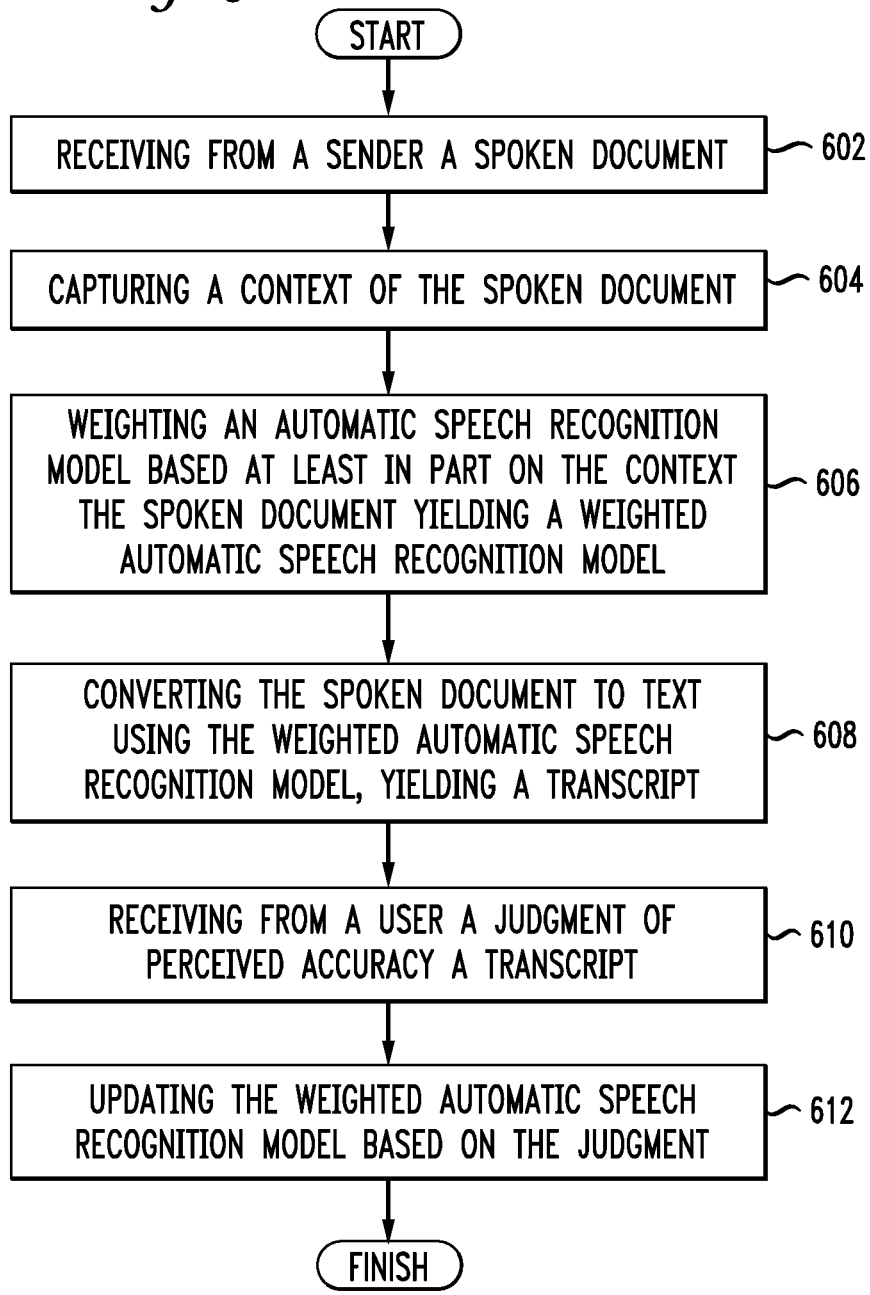

SYSTEM AND METHOD FOR OPTIMIZING SPEECH RECOGNITION AND NATURAL LANGUAGE PARAMETERS WITH USER FEEDBACK

BACKGROUND

1. Technical Field

The present disclosure relates to weighting in automatic speech recognition, and more specifically, to modifying weights in automatic speech recognition based on human judgments.

2. Introduction

Measuring accuracy in Automatic Speech Recognition (ASR) technologies commonly relies on Word Error Rate (WER). WER considers every word equally important when measuring ASR accuracy, and considers all errors made by ASR equally bad. However, in practice, the impact of all errors is not the same. Some errors have a sufficiently high impact to substantially impair the ability of a user to understand the message, while other errors have a low impact, such that the user can easily understand the important parts of the message despite the errors. Whether the transcript produced by ASR captures the meaning of the spoken message is far more important than the correct transcription of every word.

Determining whether the meaning has been successfully captured can require knowledge of which words matter to the listener. One common technique for instructing ASR models as to which words are important is to assign words a saliency weight, such that salient words are important to the user and non-salient words are less important. The trouble with this technique is that every individual user is unique, such that message content important to user A may have little consequence to user B. Moreover, what a user considers important in one exchange may vary in a separate exchange. On top of these challenges, the ASR producer is challenged to accurately produce salient values for words which can be used by a broad spectrum of the populace. These and other problems provide challenges in using ASR to recognize speech in an easily human recognizable form.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and non-transitory computer-readable storage media for assigning saliency weights to words of an ASR model. In accordance with the disclosure, the saliency values assigned to words within an ASR model can be based on human perception judgments of previous transcripts. These judgments can be stored in a database and used to create a user profile. When converting a spoken document to text, an ASR system can compare the context of that spoken document to the user profile to learn what saliency weights or filters to assign to the ASR model. Applying these saliency weights or filters to the ASR model produces a weighted ASR model, where words with high saliency value have extra weight and words with low saliency value have lower weight, for example. The system can apply linear, logarithmic, inverse, or other weighting schemes.

In one example, the extra weight given to high saliency words within the ASR model can be used to produce a more effective transcription. The system provides the transcription produced by the weighted ASR model to a user. The user then provides a perception judgment of the transcript. The system stores the perception judgments, which can be simple or complex, in the judgments database and can update the user profile of the user accordingly. The system can provide the producer of the ASR model with access to the judgment databases of users to create new, more accurate, ASR models or to adapt existing ASR models based on human perceptions. In this way, the ASR model over time becomes more accurate and produces more meaningful results to the user. This approach can provide additional benefits such as customization, improved user feedback, and ultimately an improved transcription experience.

In another example, the extra weight given to high saliency words within the ASR model can be used to score multiple ASR transcripts and determine which of those transcripts is most likely to be useful to the user. The user can then judge one or more of these transcripts and make judgments of how helpful or meaningful they consider the transcription to be. These perception judgments will then be used to modify either the ASR models themselves, or the scoring method used to determine which transcriptions have the highest utility to the user.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for weighting ASR with human perception judgments. A system, method and non-transitory computer-readable media are disclosed which record human perception judgments of ASR transcriptions and weight words in ASR transcriptions accordingly. The system, which uses human perception feedback to accurately weight words within ASR models, can store the judgments made by a user and can create user profiles based on those judgments. A brief introductory description of a basic general purpose system or computing device in FIG. 1 which can be employed to practice the concepts is disclosed herein. A more detailed description of exemplary weighted ASR configurations and an exemplary method will then follow. The disclosure now turns to FIG. 1.

Figure 1:
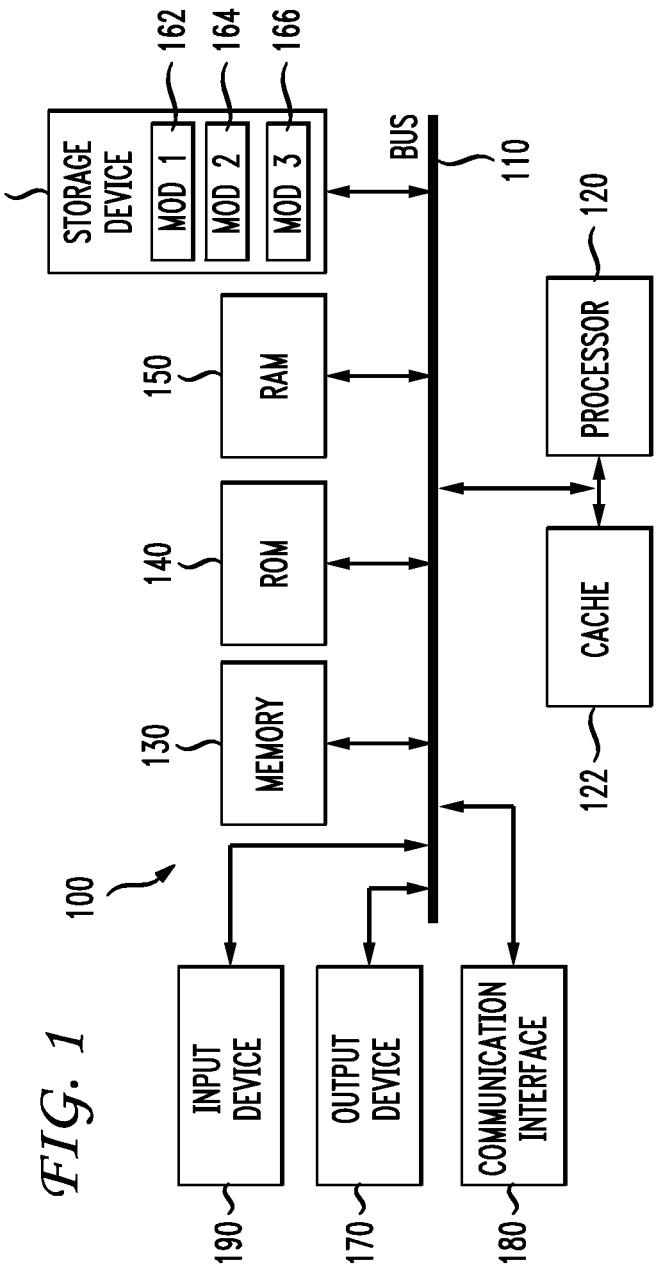
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Figure 2:
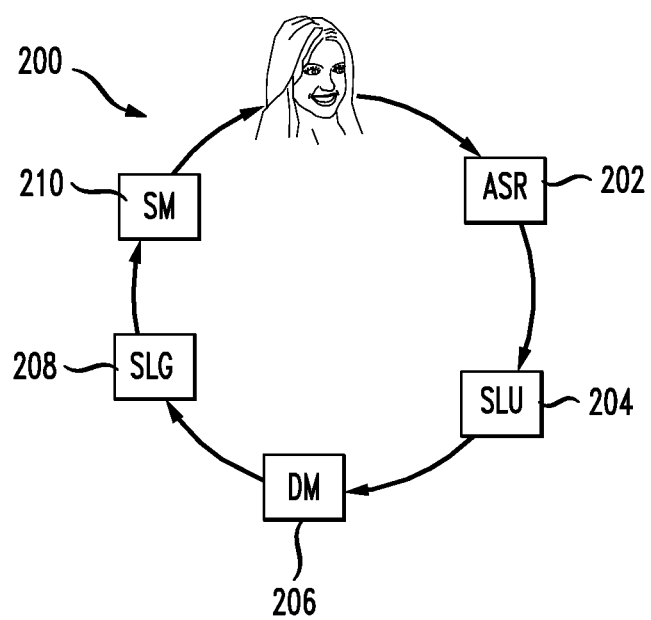
FIG. 2 illustrates a functional block diagram that illustrates an exemplary natural language spoken dialog system.

Having disclosed some components of a computing system, the disclosure now turns to FIG. 2, which illustrates an exemplary natural language spoken dialog system. FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module represents any type of speech output. The present disclosure focuses on innovations related to the ASR module 202 and can also relate to other components of the dialog system.

The automatic speech recognition module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Figure 3:
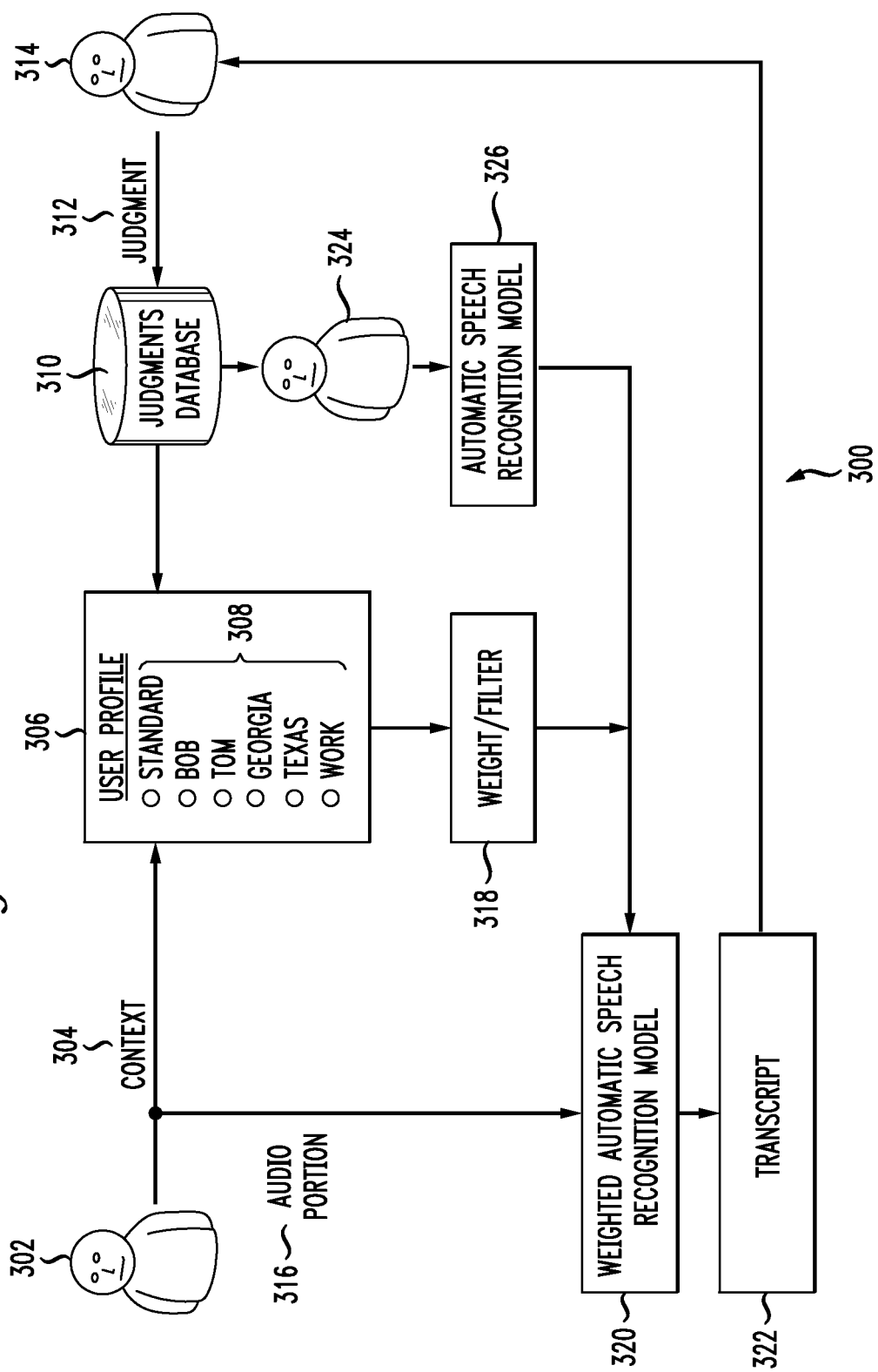
FIG. 3 illustrates a schematic block diagram illustrating one embodiment of an example system for weighting automatic speech recognition.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training automatic speech recognition module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module for automatically transcribing user speech can join the system at any point or at multiple points in the cycle or can be integrated with any of the modules shown in FIG. 2. Having described both a sample computing system and an exemplary natural language spoken dialog system, the disclosure now turns to FIG. 3 which illustrates a schematic block diagram showing one embodiment of a system 300 for weighted ASR using human perceived judgments, or a human perceived accuracy score. The system 300 shows a sender 302 forming a spoken document. In other embodiments within the scope of this disclosure, a natural language spoken dialog system 200 introduces the spoken document. However for clarity FIG. 2 depicts only a sender 302 and the ASR 326. The system can break down a spoken document into multiple components, such as the audio portion of the message 316 and the context of the message 304. This context can include the name of the sender, location of the sender, time sent or recorded, subject matter, or other quantifiable information which could help identify which words in the spoken document are of greater importance. The context of the message 304 is applied to a user profile 306. User profiles help define what information helps a particular user comprehend transcriptions, which can be a previous communication history, lists of categories or contexts, or rankings based on context probability or importance.

The system 300 attempts to find a category 308 within the user profile 306 corresponding to the spoken document context 304. Exemplary categories shown include individuals, such as 'Bob' and 'Tom', geography such as 'Georgia' and 'Texas', or 'Work.' The user 314 can create these categories, and/or the system 300 can detect that such categories would aid in transcription and create categories. For instance, if the user 314 routinely has trouble understanding transcripts made from spoken documents originating in Texas or Georgia, the user can create an appropriate category for such spoken documents. In another example, the user 314 already knows Bob and Tom, so a category for those individuals can take in to account that certain information such as phone numbers and email addresses is less valuable to the user. Should the user not have a particular category established for the context of this particular spoken document, the system can apply a standard or default category.

The selection of a category 308 determines what saliency weights 318 will be used for this spoken document. The weights 318 are applied to an ASR model 326 such that the model now values certain words more highly than others, and may be termed a weighted ASR model 320. The weighted ASR model 320 processes the audio portion 316 of the spoken document producing a transcript 322. The user 314 receives the transcript 322 made using the weighted ASR model 320 and produces a judgment 312 of how the user perceives the transcript. This judgment can be something simple such as "This is a good judgment," "Helpful," or "Bad." The judgment can also be something complicated, such as a survey as to why the transcript was or was not satisfactory.

The judgment 312 can be stored in a judgments database 310, which can be used to update the user profile 306 and the specific categories of the user profile 308. The judgments database 310 can also be passed on to the maker 324 of the ASR model 326, who can analyze the database and make updates and revisions to the ASR model 326.

Figure 4:
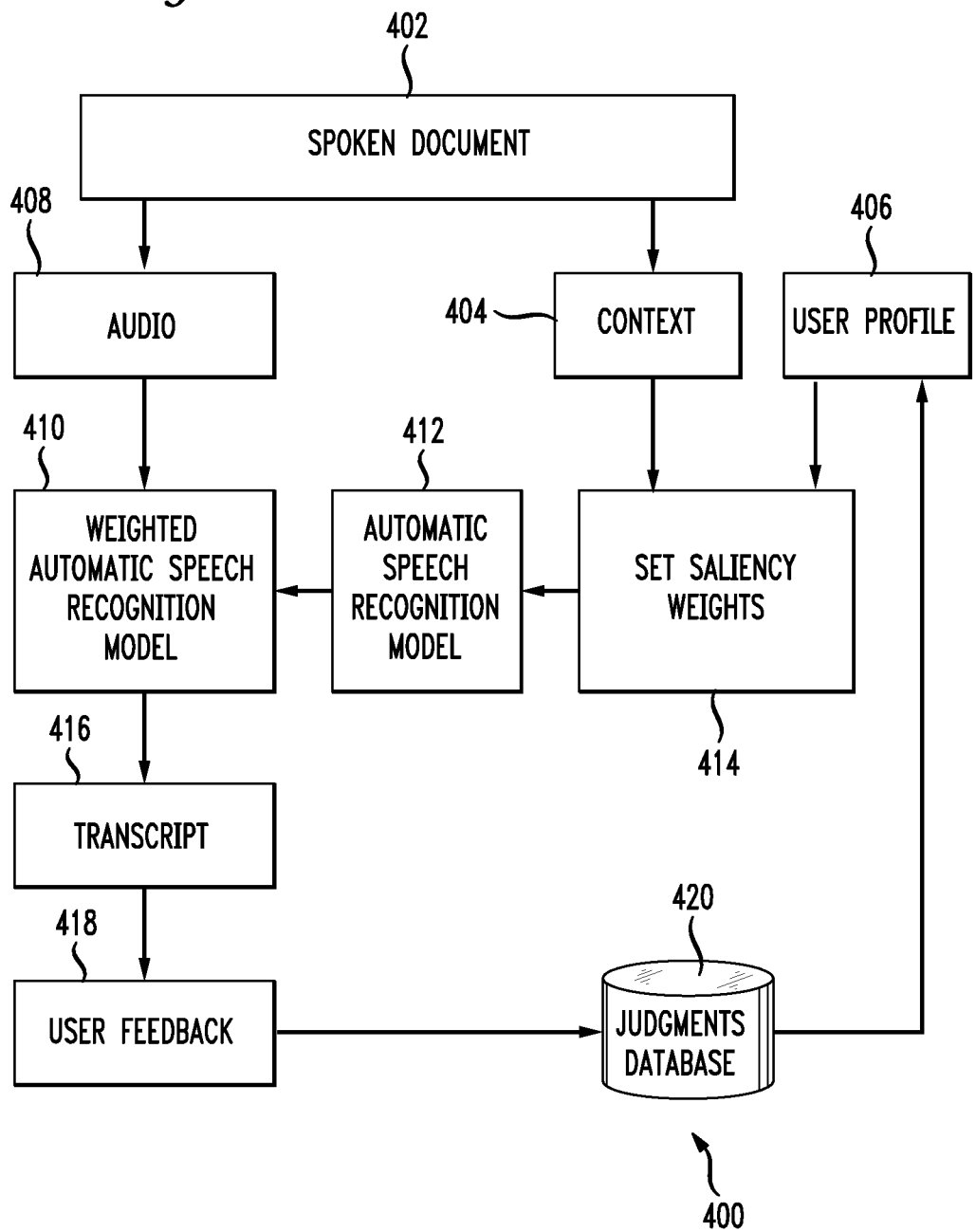
FIG. 4 illustrates a schematic block diagram illustrating one embodiment of an example system for weighting automatic speech recognition.

FIG. 4 illustrates another illustrative schematic block diagram of an example system for weighting automatic speech recognition. A system 400 receives a spoken document 402. Upon receiving the spoken document 402, the system analyzes the spoken document such that the context 404 of the spoken document 402 is determined. The system can combine the context 404 and a user profile 406 to create a set of saliency weights 414. The system can then apply these saliency weights 414 to an ASR model 412 to produce a weighted ASR model 410. The system processes the audio portion 408 of the spoken document via the weighted ASR model 410, producing a transcript 416. A user provides feedback 418 on the transcript, which is then stored in a judgments database 420. This judgments database 420 then updates the user profile 406.

Figure 5:
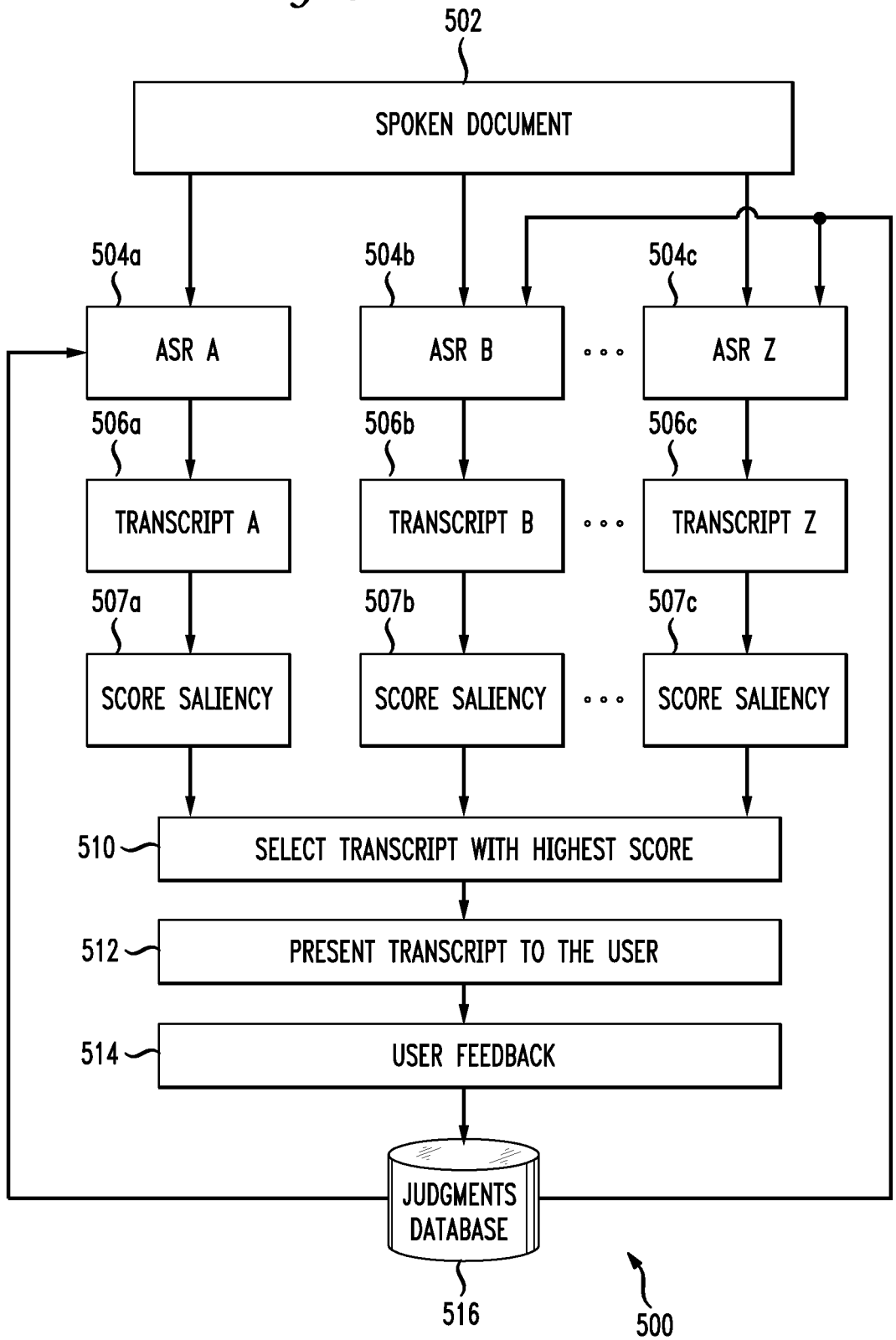
FIG. 5 illustrates a schematic block diagram illustrating one embodiment of an example system for weighting automatic speech recognition.

FIG. 5 illustrates a schematic block diagram of an exemplary system 500 for weighted ASR using human perceived judgments. The system 500 receives a spoken document 502 and processes the spoken document 502 using multiple ASR models 504a, 504b, 504c. The various ASR models each produce slightly varied transcripts 506a, 506b, 506c of the spoken document 502, which the system 500 then scores for saliency 508a, 508b, 508c. The system selects the transcript with the highest score 510 and presents that transcript to the user 512. The user provides feedback based on their perception of the transcript 514, which can be stored in a judgments database 516. The system can optionally use the judgments database 516 to modify the ASR models 504a, 504b, 504c.

One advantage of this model is that the system 500 may be unaware of why particular feedback 514 was presented. The system 500 can test various hypotheses as to why the user perceived a previous transcript as helpful or not. While FIG. 5 illustrates only one transcript being presented to the user 512, other embodiments can present multiple transcripts to the user, who can then provide feedback on some or all of the multiple transcripts. This approach can facilitate rapid creation of categories for the user profile, quickly refine ASR models, or simply provide varied transcription options to the user.

Having disclosed some basic system components and concepts, the disclosure now turns to the exemplary method embodiment shown in FIG. 6. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps. The system 100 receives from a sender a spoken document (602) and captures the context of the spoken document (604). Contexts of the spoken document, such as the name of the sender, time sent, subject matter, may all be captured by the system. The system 100 then weights an ASR model based at least in part on the context of the spoken document, yielding a weighted ASR model (606). Weighting of the ASR model can also be based on word frequency within the spoken document, or within common speech patterns. Weighting can also be based on a user profile, the profile built from communication histories, lists of contexts, and other useful information about the spoken document. The information within the user profile, particularly the lists of contexts, can be ranked according to importance. Within the weighted ASR model, those words of high predicted importance to the user are considered "high saliency" words, whereas those words of low predicted importance to the user are considered "low saliency" words. The system converts the spoken document to text using the weighted ASR model, yielding a transcript (608). In one embodiment, a weighted ASR transcription entails basing the looking up additional ASR models based on weights presented, while in another embodiment the weighted ASR instructs the processor to spend more cycles processing high saliency text.

Upon receiving a transcript, the user provides to the system 100 a judgment of perceived accuracy of the transcript (610), after which the weighted ASR model receives updates based on that judgment (612). In one embodiment, this transcript receives a score based on predicted errors in conversion, the user profile, and the context of the speech document, prior to delivery to the user. Such an embodiment can be used to select from multiple ASR transcriptions which transcript is most likely to be helpful to the user. This embodiment would then receive a similar perception judgment by the user (610), which would again update the weighted ASR model or models (612).

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can allow users to make judgments based on their perceptions of a transcription, and based on those judgments, modify an ASR model. The modified ASR model then weights words, filters words, or otherwise places saliency on words which have importance to the user's understanding. In some embodiments, this can be enacted by the weighted ASR model processing phones associated with high saliency words more accurately. In other embodiments, this can be enacted by the weighted ASR model scoring a transcription to determine the particular utility to a user. Those skilled in the art will readily recognize various modifications and changes that may be made to the principles described herein without following the example embodiments and applications illustrated and described herein, and without departing from the spirit and scope of the disclosure.

We claim:

1. A method comprising:
    receiving, from a sender, a speech document;
    capturing, via a processor, a context of the speech document;
    weighting a first automatic speech recognition model based on the context of the speech document, to yield a weighted first automatic speech recognition model;
    weighting a second automatic speech recognition model based on the context of the speech document, to yield a weighted second automatic speech recognition model;
    converting, via the processor, the speech document to text using the weighted first automatic speech recognition model, to yield a first transcript;
    converting, via the processor, the speech document to text using the weighted second automatic speech recognition model, to yield a second transcript;
    receiving, from a user, a judgment of perceived accuracy of the first transcript and the second transcript; and
    updating, via the processor, the weighted first automatic speech recognition model and the weighted second automatic speech recognition model based on the judgment.

2. The method of claim 1, wherein the context of the speech document comprises one of a name of the sender, a location of the sender, a time sent, and a subject.

3. The method of claim 1, wherein weighting of the first automatic speech recognition model and weighting of the second automatic speech recognition model is further based on a user profile.

4. The method of claim 3, wherein the user profile comprises one of a previous communication history and a list of contexts.

5. The method of claim 4, wherein each context in the list of contexts comprises an importance ranking.

6. The method of claim 3, wherein the transcripts receive a score based on predicted errors in conversion, the user profile, and the context of the speech document.

7. The method of claim 1, wherein the weighted first automatic speech recognition model and the weighted second automatic speech recognition model assign a saliency weight to a set of words, based on a frequency of the set of words, the context of the speech document, and a user profile.

8. The method of claim 7, wherein a high saliency weight indicates high predicted importance to the user.

9. The method of claim 7, wherein converting the speech document to text is based on the saliency weight of a portion of the text.

10. The method of claim 9, wherein the weighted first automatic speech recognition model and the weighted second automatic speech recognition model direct the processor to spend more effort converting to text high saliency text.

11. A system, comprising:
    a processor; and
    a computer-readable storage medium having instructions stored which, when executed by the processor, cause the processor to perform operations comprising:
        receiving, from a sender, a speech document;
        capturing a context of the speech document;
        weighting a first automatic speech recognition model based on the context of the speech document and, to yield a weighted first automatic speech recognition model;
        weighting a second automatic speech recognition model based on the context of the speech document, to yield a weighted second automatic speech recognition model;
        converting the speech document to text by applying the weighted first automatic speech recognition model, to yield a first transcript;
        converting the speech document to text by applying the weighted second automatic speech recognition model, to yield a second transcript;
        receiving, from a user, a judgment of perceived accuracy of the first transcript and the second transcript; and
        updating the weighted first automatic speech recognition model and the weighted second automatic speech recognition model based on the judgment.

12. The system of claim 11, wherein the weighted first automatic speech recognition model and the weighted second automatic speech recognition model assign a saliency weight to a set of words, based on a frequency of the set of words, the context of the speech document, and a user profile.

13. The system of claim 12, wherein a high frequency of the set of words yields a low saliency weight and a low frequency of the set of words yields a high saliency weight.

14. The system of claim 11, wherein the weighting of the first automatic speech recognition model and the weighting of the second automatic speech recognition model is further based on a likelihood that a set of words was erroneously recognized.

15. The system of claim 14, wherein the likelihood that the set of words was erroneously recognized is determined based on a word insertion error rate, a word deletion error rate, and a word substitution error rate.

16. The system of claim 11, wherein the judgment is received from one of a keyboard, a vocal response, a pointing device, and a touch screen.

17. A computer-readable storage device having instructions stored which, when executed by a computing device, cause the computing device to perform operations comprising:
    receiving from a sender a speech document;
    capturing a context of a speech document;
    weighting a first automatic speech recognition model based on the context of the speech document, to yield a weighted first automatic speech recognition model;
    weighting a second automatic speech recognition model based on the context of the speech document, to yield a weighted second automatic speech recognition model;
    converting the speech document to text using the weighted first automatic speech recognition model, to yield a first transcript;
    converting the speech document to text using the weighted second automatic speech recognition model, to yield a second transcript;
    receiving, from a user, a judgment of perceived accuracy of the first transcript and the second transcript; and
    updating, via the processor, the weighted first automatic speech recognition model and the weighted second automatic speech recognition model based on the judgment.

18. The computer-readable storage device of claim 17, wherein the weighting of the first automatic speech model and the weighting of the second automatic speech model is further based on a user profile, the frequency within the speech document of a set of words, and a geographical location associated with the speech document.

19. The computer-readable storage device of claim 17 having additional instructions stored which result in the operations further comprising:
    storing the judgment in a database, yielding a stored judgment;

updating the weighted first automatic speech recognition model and the weighted second automatic speech recognition model based on the stored judgment.

20. The computer-readable storage device of claim 19 having additional instructions stored which result in the operations further comprising:
providing the stored judgment to a manufacturer of the first automatic speech recognition model and the second automatic speech recognition model.

\* \* \* \* \*